United States Patent [19]
Kreitzer

[11] 4,303,315
[45] * Dec. 1, 1981

[54] COMPACT WIDE ANGLE LENS
[75] Inventor: Melvyn H. Kreitzer, Cincinnati, Ohio
[73] Assignee: Vivitar Corporation, Santa Monica, Calif.
[*] Notice: The portion of the term of this patent subsequent to Jan. 8, 1997, has been disclaimed.
[21] Appl. No.: 97,552
[22] Filed: Nov. 26, 1979

Related U.S. Application Data
[63] Continuation-in-part of Ser. No. 83,289, Oct. 10, 1979, abandoned, which is a continuation of Ser. No. 941,522, Sep. 11, 1978, Pat. No. 4,182,549.

[51] Int. Cl.³ .................................................. G02B 9/62
[52] U.S. Cl. ..................................................... 350/461
[58] Field of Search .......................................... 350/461

[56] References Cited
U.S. PATENT DOCUMENTS
3,963,325  6/1976  Takahashi ............................. 350/461
4,182,549  1/1980  Kreitzer ................................ 350/464

*Primary Examiner*—John K. Corbin
*Assistant Examiner*—Scott J. Sugarman
*Attorney, Agent, or Firm*—DeLio and Montgomery

[57] ABSTRACT

A very compact lens of the retrofocus type, capable of covering a field angle of up to 63°, comprising six elements including a singlet front group of strong negative power, and having extremely good aberrational correction.

5 Claims, 4 Drawing Figures

FIG. 3

TANGETIAL  SAGITTAL (31.67°)

(21.79°)

(15.94°)

(0.00°)

COMPACT WIDE ANGLE LENS

This application is a continuation in part of application Ser. No. 83,289, filed Oct. 10, 1979 now abandoned, which is a continuation of application Ser. No. 941,522, filed Sept. 11, 1978 now U.S. Pat. No. 4,182,549.

The present invention relates to an improved optical system and more particularly relates to a lens of the retrofocus type which is quite compact and requires only six elements.

Wide angle lenses for use with interchangeable lens cameras, such as cameras of the 35 mm format, have been improved as to size, bulk, weight and optical characteristics as well as relative cost over the last few years. However, further improvements, particularly more compactness and decreased relative cost while maintaining and improving the degree of optical correction are desirable.

A wide angle lens of the inverted telephoto type generally includes a group of a strong negative power at the front of the lens followed by a strong positive power at the rear thereof. Generally, these strong powers together with the highly asymmetric form of the lens make certain aberrational corrections difficult, which difficulty increases with increasing power of the front group. However, an improved exceedingly compact and well corrected wide angle lens of moderate cost is provided according to the present invention. This six element lens is capable of covering field angles of up to 63° at an effective aperture of f/2.8.

Briefly stated, a lens according to the invention comprises as little as six elements in three groups. The first group comprises a strongly negative single element; the second group comprises two positive elements; and the third group comprises a biconcave element, and two positive menisci, both concave to the image. The strong negative front group enables the lens to be more compact but increases the aberration correction in the following elements. The compact size and resulting necessary correction is achieved by designing the lens with the following relationship $0.8 f_o > |f_1| > 0.6 f_o$ $0.55 f_o > f_2 > 0.5 f_o$ $5 f_o > |f_3| > 3 f_o$ where $f_1$, $f_2$, and $f_3$ are the equivalent focal lengths (EFL) of the first, second and third groups, respectively, and $f_o$ is the EFL of the overall lens.

An object of the present invention is to provide a new and improved compact, well corrected wide angle lens.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

FIG. 3 is a series of graphical representations of various aberrations of the lens system of FIG. 1.

Figure 1:
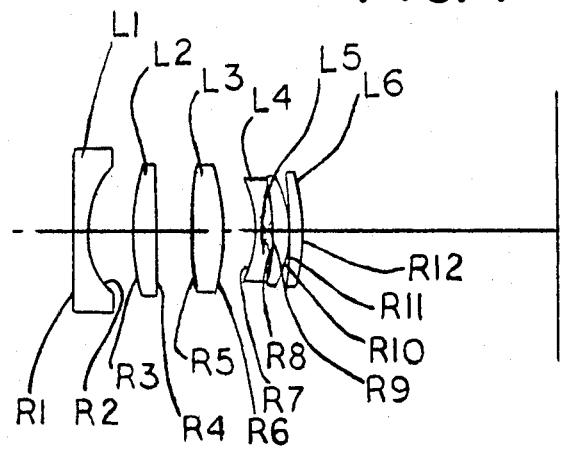
FIG. 1 is a diagrammatic sectional view of an optical system embodying the present invention.

Referring to the drawings, a wide angle lens of the inverted telephoto type having a relatively long back focal length is shown. The lens is designed to be compact, yet to have optimum balance of distortion and aberrations. To achieve the long back focus while keeping the lens as compact as possible, the front group of the lens is provided with strong negative power which is balanced in the following groups. The second group is also of relatively strong positive power while the third group is of relatively weak negative power. Although these strong powers, together with the highly asymmetric form of the lens, make the correction of coma, lateral color and distortion particularly troublesome, extremely good correction of aberrations has been achieved without the use of an excessive number of elements or of expensive high-index glass.

Shown in FIG. 1 is an embodiment of an optical system forming a six element objective lens capable of covering a total field angle up to 63° at a relative aperture of f/2.8. The first group G1 comprises a negative element L1 having a large radius object side surface S1 and a small radius image side surface S2. This front group is followed by group G2 comprising an air spaced positive element L2 and a bi-convex element L3. Group G3 comprises a fourth element L4, of negative power and bi-concave configuration, air spaced from the element L3, followed by two positive elements L5 and L6. Group 3 is of overall weak negative power.

A lens as described above is substantially described in Table I which sets forth data as to the dimensions, parameters, and optical materials of the lens of FIG. 1 as scaled to an EFL of 35 mm for a 24×36 mm image frame.

TABLE I

| Element | Surface Radii (mm) | Axial Distance Between Surfaces (mm) | $N_d$ | $V_d$ |
|---|---|---|---|---|
| L1 | R1 = 171.000 | | | |
| | | 2.50 | 1.607 | 56.7 |
| | R2 = 13.603 | 7.22 | | |
| L2 | R3 = 26.710 | | | |
| | | 4.00 | 1.720 | 50.3 |
| | R4 = 246.680 | | | |
| | | 5.32 | | |
| L3 | R5 = 44.448 | | | |
| | | 5.50 | 1.617 | 53.9 |
| | R6 = −26.718 | | | |
| | | 4.78 | | |
| L4 | R7 = −17.288 | | | |
| | | 1.50 | 1.785 | 26.1 |
| | R8 = 51.100 | | | |
| | | 1.31 | | |
| L5 | R9 = −35.100 | | | |
| | | 2.46 | 1.720 | 50.3 |
| | R10 = −16.708 | | | |
| | | 0.2 | | |
| L6 | R11 = −81.42 | | | |
| | | 2.20 | 1.762 | 40.3 |
| | R12 = −27.96 | | | |

In the above table, the first column lists lens elements from the object side, the second column lists the surfaces of the lens elements numerically starting at the ray entrance side of the system. The third column lists the radii for the respective surfaces of the elements with the positive values of the radii indicating surfaces which are convex to the ray entrance and the negative values (−)

of the radii indicating surfaces which are concave. The fourth column lists the thickness of the element and the spacing therebetween. The fifth and sixth columns list respectively the refractive index $N_d$ and the dispersive index $V_d$ of the element.

Figure 2A:
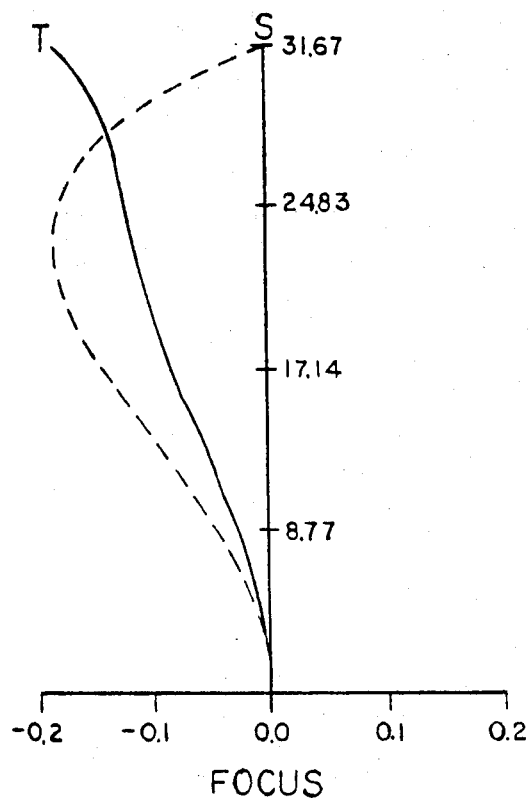
FIG. 2A is a graphical representation of the astigmatic field curves of the lens system shown in FIG. 1 and having the design data given in Table I.
Figure 2B:
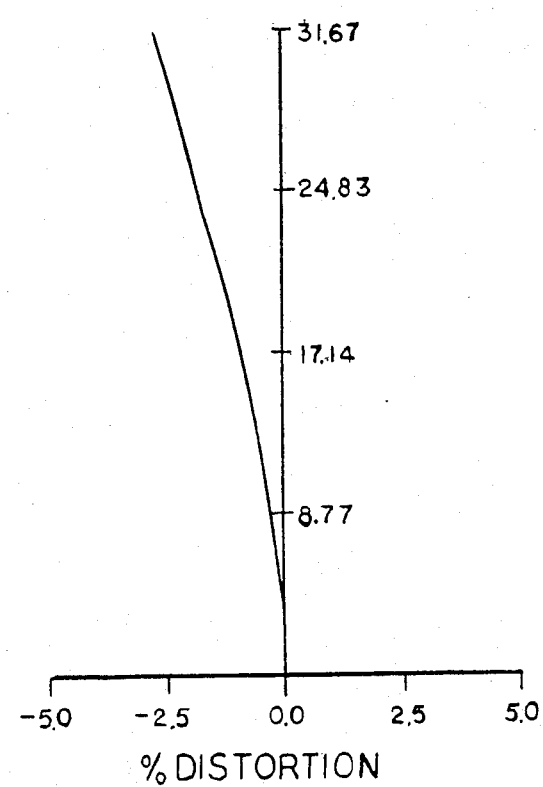
FIG. 2B is a graphical representation of the distortion of the lens plotted as a percentage deviation from a "perfect" image.
Figure 3:
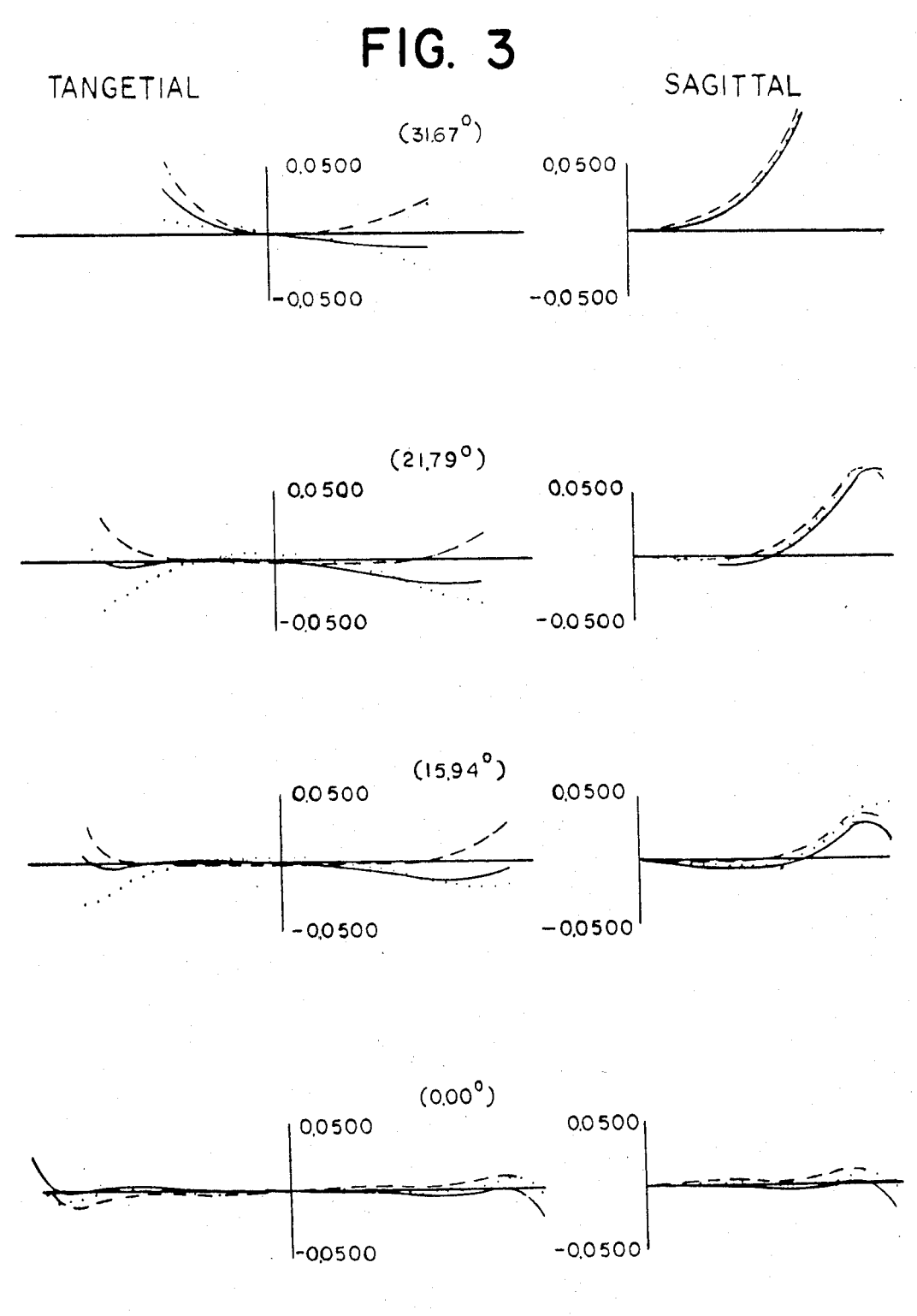

FIGS. 2A, 2B and 3 exemplify the good degree of correction achieved in this compact, six element lens.

FIG. 2A represents astigmatic field curves for transverse tangential (T) and sagittal (S) field curvature, respectively, as shown in solid and dotted lines. FIG. 2B represents the distortion plotted as a percentage deviation from a "perfect" image. FIG. 3 graphically represents various transverse ray aberrations of the optical system shown in FIG. 1 and having the design data set forth in Table I above. The dashed line curve represents the axial ray bundle for 480.0 nm wavelength; the solid line is for 546.1 nm wavelength; and the dotted line is for 643.8 nm wavelength.

Other embodiments of lenses embodying this invention are exemplified through the following Tables II–IV setting forth the same data as Table I, for lenses of 35 mm EFL and 24×36 mm image frame.

TABLE II

| Element | Surface Radii (mm) | Axial Distance Between Surfaces (mm) | $N_d$ | $V_d$ |
|---|---|---|---|---|
| L1 | R1 = 199.566 | | | |
|  | | 2.50 | 1.607 | 56.7 |
|  | R2 = 13.720 | | | |
|  | | 6.46 | | |
| L2 | R3 = 29.451 | | | |
|  | | 4.50 | 1.773 | 49.6 |
|  | R4 = −427.934 | | | |
|  | | 5.09 | | |
| L3 | R5 = 39.406 | | | |
|  | | 6.00 | 1.618 | 55.2 |
|  | R6 = −26.522 | | | |
|  | | 4.83 | | |
| L4 | R7 = −18.724 | | | |
|  | | 1.50 | 1.785 | 26.1 |
|  | R8 = 48.112 | | | |
|  | | 1.40 | | |
| L5 | R9 = −31.327 | | | |
|  | | 2.39 | 1.773 | 49.6 |
|  | R10 = 16.526 | | | |
|  | | 0.20 | | |
| L6 | R11 = −129.256 | | | |
|  | | 2.13 | 1.762 | 40.3 |
|  | R12 = −33.339 | | | |

TABLE III

| Element | Surface Radii (mm) | Axial Distance Between Surfaces (mm) | $N_d$ | $V_d$ |
|---|---|---|---|---|
| L1 | R1 = 132.090 | | | |
|  | | 2.75 | 1.607 | 56.7 |
|  | R2 = 14.487 | | | |
|  | | 6.18 | | |
| L2 | R3 = 28.138 | | | |
|  | | 2.82 | 1.804 | 46.5 |
|  | R4 = 616.422 | | | |
|  | | 7.27 | | |
| L3 | R5 = 48.374 | | | |
|  | | 6.00 | 1.691 | 54.7 |
|  | R6 = −28.978 | | | |
|  | | 3.99 | | |
| L4 | R7 = −20.131 | | | |
|  | | 2.20 | 1.785 | 26.1 |
|  | R8 = 50.479 | | | |
|  | | 1.73 | | |
| L5 | R9 = −22.131 | | | |
|  | | 1.91 | 1.804 | 46.5 |
|  | R10 = −15.529 | | | |
|  | | 0.20 | | |
| L6 | R11 = 920.951 | | | |
|  | | 1.96 | 1.804 | 46.5 |
|  | R12 = −41.861 | | | |

TABLE IV

| Element | Surface Radii (mm) | Axial Distance Between Surfaces (mm) | $N_d$ | $V_d$ |
|---|---|---|---|---|
| L1 | R1 = 96.553 | | | |
|  | | 2.75 | 1.613 | 58.6 |
|  | R2 = 14.285 | | | |
|  | | 6.14 | | |
| L2 | R3 = 30.194 | | | |
|  | | 2.79 | 1.804 | 46.5 |
|  | R4 = 309.279 | | | |
|  | | 7.69 | | |
| L3 | R5 = 38.950 | | | |
|  | | 6.00 | 1.694 | 53.3 |
|  | R6 = −29.416 | | | |
|  | | 3.96 | | |
| L4 | R7 = −21.199 | | | |
|  | | 1.60 | 1.785 | 26.1 |
|  | R8 = 41.987 | | | |
|  | | 1.93 | | |
| L5 | R9 = −21.026 | | | |
|  | | 1.96 | 1.804 | 46.5 |
|  | R10 = −14.956 | | | |
|  | | 0.20 | | |
| L6 | R11 = 192.945 | | | |
|  | | 1.98 | 1.804 | 46.5 |
|  | R12 = −51.526 | | | |

Table V sets forth the powers expressed in EFL of the lens groups of the foregoing examples.

TABLE V

|  | $f_o$ | $f_1/f_o$ | $f_2/f_o$ | $f_3/f_o$ |
|---|---|---|---|---|
| Table I | 35mm | −0.700 | 0.516 | −3.983 |
| Table II | 35 | −0.698 | 0.517 | −4.303 |
| Table III | 35.7 | −0.754 | 0.527 | −4.397 |
| Table IV | 35.7 | −0.773 | 0.527 | −3.678 |

From the foregoing it may be seen that the following relationships are followed.

$$0.8\, f_o > |f_1| > 0.6\, f_o$$

$$0.55\, f_o > f_2 > 0.5\, f_o$$

$$5\, f_o > |f_3| > 3\, f_o$$

The relative weakness of the optical power of the third group permits a wider range of EFL's to correct a particular design in view of the relatively strong first and second groups.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A retrofocus lens consisting of six elements from the object end, a first negative meniscus convex to the object, second and third positive elements, a fourth biconcave element, a fifth positive meniscus concave to the object and a sixth positive element where $$0.8 f_o > |f_1| > 0.6 f_o \text{ and}$$

$$0.55 f_o > f_2 > 0.5 f_o$$

where
- $f_1$ is the equivalent focal length (EFL) of the first element,
- $f_2$ is the equivalent focal length (EFL) of the second and third elements,
- $f_o$ is the EFL of the lens.

2. The lens of claim 1 where $$5 f_o > |f_3| > 3 f_o$$

where $f_3$ is the equivalent focal length of the fourth, fifth and sixth elements.

3. A lens according to claim 1 as scaled to an equivalent focal length of 35 mm for a 24×36 mm image frame defined substantially as follows:

| Element | Surface Radii (mm) | Axial Distance Between Surfaces (mm) | $N_d$ | $V_d$ |
|---|---|---|---|---|
| L1 | R1 = 132.090 | | | |
|    |              | 2.75 | 1.607 | 56.7 |
|    | R2 = 14.487  | | | |
|    |              | 6.18 | | |
| L2 | R3 = 28.138  | | | |
|    |              | 2.82 | 1.804 | 46.5 |
|    | R4 = 616.422 | | | |
|    |              | 7.27 | | |
| L3 | R5 = 48.374  | | | |
|    |              | 6.00 | 1.691 | 54.7 |
|    | R6 = −28.978 | | | |
|    |              | 3.99 | | |
| L4 | R7 = −20.131 | | | |
|    |              | 2.20 | 1.785 | 26.1 |
|    | R8 = 50.479  | | | |
|    |              | 1.73 | | |
| L5 | R9 = −22.131 | | | |
|    |              | 1.91 | 1.804 | 46.5 |
|    | R10 = −15.529| | | |
|    |              | 0.20 | | |
| L6 | R11 = 920.951| | | |
|    |              | 1.96 | 1.804 | 46.5 |
|    | R12 = −41.861| | | | where L1–L6 represent the lens elements from the object to the image side; R1–R12 are the radii of the lens surfaces stated in millimeters; $N_d$ is the index of refraction of each lens element; and $V_d$ is the dispersion of each lens element in terms of its Abbe number.

4. A lens according to claim 1 as scaled to an equivalent focal length of 35 mm for a 24×36 mm image frame defined substantially as follows:

| Element | Surface Radii (mm) | Axial Distance Between Surfaces (mm) | $N_d$ | $V_d$ |
|---|---|---|---|---|
| L1 | R1 = 96.553  | | | |
|    |              | 2.75 | 1.613 | 58.6 |
|    | R2 = 14.285  | | | |
|    |              | 6.14 | | |
| L2 | R3 = 30.194  | | | |
|    |              | 2.79 | 1.804 | 46.5 |
|    | R4 = 309.279 | | | |
|    |              | 7.69 | | |
| L3 | R5 = 38.950  | | | |
|    |              | 6.00 | 1.694 | 53.3 |
|    | R6 = −29.416 | | | |
|    |              | 3.96 | | |
| L4 | R7 = −21.199 | | | |
|    |              | 1.60 | 1.785 | 26.1 |
|    | R8 = 41.987  | | | |
|    |              | 1.93 | | |
| L5 | R9 = −21.026 | | | |
|    |              | 1.96 | 1.804 | 46.5 |
|    | R10 = −14.956| | | |
|    |              | 0.20 | | |
| L6 | R11 = 192.945| | | |
|    |              | 1.98 | 1.804 | 46.5 |
|    | R12 = −51.526| | | | where L1–L6 represent the lens elements from the object to the image side; R1–R12 are the radii of the lens surfaces stated in millimeters; $N_d$ is the index of refraction of each lens element; and $V_d$ is the dispersion of each lens element in terms of its Abbe number.

5. A retrofocus lens comprising three groups of negative, positive and negative power from the object end, said first group comprising a negative meniscus convex to the object end having an equivalent focal length whose absolute value is between 0.6 and 0.8 of the equivalent focal length of the overall lens, said second group having an equivalent focal length between 0.5 and 0.55 of the equivalent focal length of the overall lens.

* * * * *